W. H. STICKLE.
Assignor, by mesne assignments, to T. D. OLIN.
VEHICLE SPRING.
No. 10,372. Reissued Aug. 21, 1883.
Fig. 1.
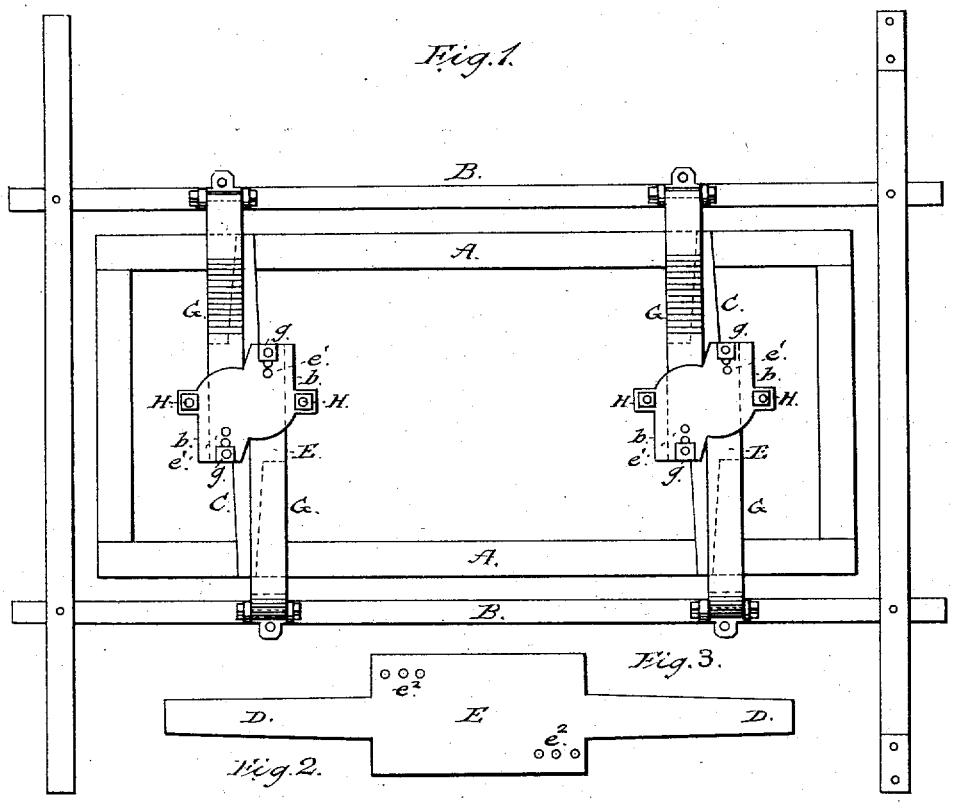
Fig. 3.
Fig. 2.
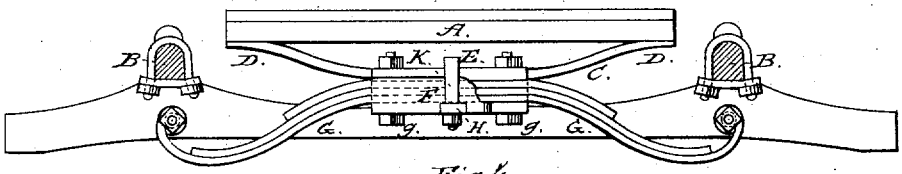
Fig. 4.
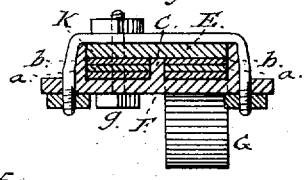
Fig. 5.
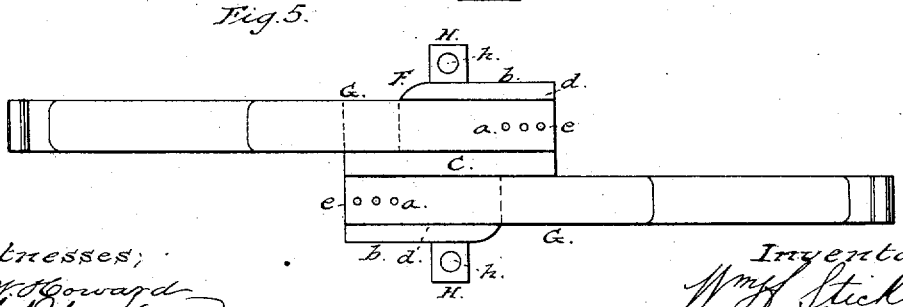
Witnesses;
H. W. Howard
J. McE. Blackwood
Inventor;
Wm. H. Stickle
by M. A. Dowling
Attorney
N. PETERS, Photo-Lithographer, Washington, D. C.

UNITED STATES PATENT OFFICE.

WILLIAM H. STICKLE, OF TERRE HAUTE, INDIANA, ASSIGNOR, BY MESNE ASSIGNMENTS, TO THOMAS D. OLIN, OF SAME PLACE.

VEHICLE-SPRING.

SPECIFICATION forming part of Reissued Letters Patent No. 10,372, dated August 21, 1883.

Original No. 246,571, dated August 30, 1881. Application for reissue filed May 3, 1883.

*To all whom it may concern:*

Be it known that I, WILLIAM H. STICKLE, a citizen of the United States, residing at Terre Haute, in the county of Vigo and State of Indiana, have invented certain new and useful Improvements in Vehicle-Springs, and have assigned all my right, title, and interest in the same to THOMAS D. OLIN, also a citizen of the United States; and I do hereby declare the following to be a full, clear, and exact description of the invention, such as will enable others skilled in the art to which it appertains to make and use the same.

Figure 1 of the drawings is a representation of a bottom view of my invention. Fig. 2 is a cross-section. Fig. 3 is a plan view of the truss-bar or bearing. Fig. 4 is a cross-section through the crab, and Fig. 5 is a top view of same with truss-bar removed.

This invention has relation to vehicle-springs and attachments therefor; and it consists in the construction and novel arrangement, in connection with sectional springs, of a crab or coupling for the ends of the springs and a truss-bar or cross-bearing, whereby the springs are connected to the body-frame, all as hereinafter shown and described.

In the accompanying drawings, the letter A designates the sills of the body-frame of a buggy or other vehicle, and B B represent the side bars or end bearings, as the case may be, the illustration being especially designed to show the application of the invention with relation to a side-bar buggy.

C indicates the truss-bar or bearing, which is secured by its ends or arms D to the sills. The truss-bar is provided with a central bearing, E, of proper width to fit between the side flanges, *b*, of the crab or coupling F, in which the ends *a* of the sectional springs G are seated. This crab is provided with a central dividing-flange, *c*, between its side walls, separating two parallel seats, *d*, in which are placed the ends *a*, respectively, of springs which extend in opposite directions, as indicated in the drawings, The side flanges, *b*, are made of greater height than the center flange, *c*, so that the center bearing, E, of the truss-bar will be received neatly between said side flanges when the parts are secured together. The ends of the springs are provided with perforations *e*, and a series of perforations, *e'*, are made through the bottom of the crab and through the center bearing, E, as indicated at $e^2$, said perforations serving for the passage of bolts *g*, whereby the ends of the springs are secured in position between said crab and center bearing. The perforations are arranged in series, so that the springs may be readily adjusted according to the width of the work in hand.

H H designate lugs extending from the crab at right angles with the spring-bearings, and perforated at *h* for the passage of the threaded ends of the clip K, which passes over the center bearing of the truss-bar, and is designed to secure the parts firmly together.

It may sometimes be advisable to form the central or dividing flange of the spring-bearing on the truss-bar instead of the crab; but the construction hereinbefore described is preferred.

The outer ends of the sectional springs may be connected to the side bars by means of shackles, in the ordinary manner.

Having described this invention, what I claim, and desire to secure by Letters Patent, is—

1. The combination, with sectional springs, of a crab or coupling for the ends of the springs, and a truss-bar or cross-bearing and a center bearing-clip for connecting the springs to the body-frame, substantially as described.

2. The crab F, having the side flanges, *b*, parallel seats *d*, the dividing-flange *c*, and perforations *e'*, in combination with the truss-bar C, having perforations $e^2$, arms D, and center bearing, E, and the clip K, substantially as specified.

In testimony whereof we affix our signatures in presence of two witnesses.

WILLIAM H. STICKLE.
THOMAS D. OLIN.

Witnesses:
H. H. BOUDINOT,
JAMES D. BIGELOW.